3,418,332
DIBENZOCYCLOHEPTENE THIAZOLE
DERIVATIVES
Martin A. Davis, Montreal, Quebec, and David J. Campbell, Pincourt, Quebec, Canada, assignors to American Home Products Corporation, New York, N.Y., a corporation of Delaware
No Drawing. Filed May 23, 1966, Ser. No. 551,938
7 Claims. (Cl. 260—302)

ABSTRACT OF THE DISCLOSURE

Compounds of the formula:

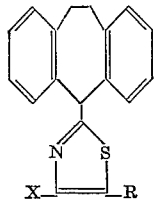

wherein X is aryl and R is hydrogen or alkyl of 1–4 carbon, are useful as larvicides, anthelmintics, bactericides, trichomonicides, and anti-ulcer agents.

---

This invention relates to novel chemical compounds having useful biological properties. More particularly this invention relates to novel 5H-dibenzo[a,d]cyclohepten-5-yl-thiazole derivatives and to their pharmacologically acceptable salts which may be represented by the general formula:

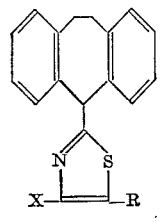

(I)

in which X represents an aryl group, for example, the phenyl group, and R represents hydrogen or a lower alkyl group containing from 1–4 carbon atoms.

The compounds of this invention may be obtained from the condensation of 10,11-dihydro-5H-dibenzo[a,d]cycloheptene-5-thiocarboxamide of Formula II, prepared according to the general procedure described by E. C. Kornfeld, in J. Org. Chem., vol. 16, p. 131 (1951) by reacting 10,11 - dihydro - 5H-dibenzo[a,d]cycloheptene-5-carbonitrile either with ammonia and hydrogen sulfide in ethanol under pressure, or with thioacetamide in dimethylformamide with hydrogen chloride according to the general procedure described by E. C. Taylor et al. in J. Am. Chem. Soc., vol. 82, p. 2656 (1960), with alpha halo carbonyl compounds such as, for example, an alpha-haloketone, of the formula XCOCHRHal in which X and R are as defined above and Hal represents a halogen with an atomic weight greater than 19, to give the thiazole derivative of Formula I.

This reaction may be shown diagrammatically as follows:

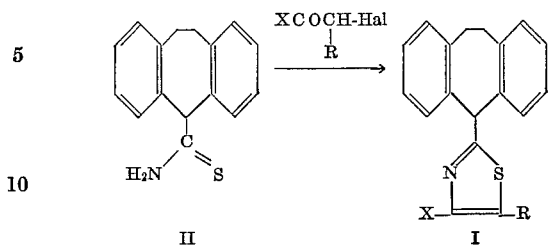

The compounds of this invention have important biological properties and are useful as medicaments. They possess larvicidal action against horse strongyles and may be used to decontaminate premises or pastures which have been infected with members of the strongylidae family, for example hookworms, trichostrongylidae, or metastrongylidae. For such purpose the compounds may be formulated as suspensions in an appropriate vehicle, for example, water, so as to contain an amount of the active ingredient of from 0.01 to 0.001 mole per liter. The compounds also have anthelminthic effect against *Syphacia obvelata* and are useful for the treatment of pinworm infestations in mammals. They also possess antibacterial and trichomonicidal activity, especially against *Trichomonas vaginalis*.

In addition, the compounds possess the unexpected property of inhibiting the ulcerogenic effect of reserpine in mammals and are useful as anti-ulcer agents. For this purpose they may be formulated for oral administration in the form of compressed tablets, capsules or as a suspension in an aqueous vehicle so as to contain from 25 to 150 mg. of the active ingredient per unit dosage form, and may be administered from once to four times daily.

The following descriptive examples will serve to illustrate this invention but are not to be construed so as to limit it thereto.

EXAMPLE 1

A solution of 10,11-dihydro-5H-dibenzo[a,d]cycloheptene-5-thiocarboxamide (7.6 g., 0.03 mole) and alpha-chloroacetophenone (5.1 g., 0.03 mole) in chloroform (250 ml.) is heated under reflux for 24 hours; an appreciable amount of water forms after the first two hours. The mixture is evaporated and the residue is recrystalized from ethanol. There is obtained 2-(10,11-dihydro-5H - dibenzo[a,d]cyclohepten - 5 - yl) - 4 - phenylthiazole of M.P. 121–122° C. Elemental analysis confirms the empirical formula $C_{24}H_{19}NS$.

In the same manner, but using α-chloropropiophenone or α-bromobutyrophenone as starting materials, there are obtained the corresponding 2-(10,11-dihydro-5H-dibenzo[a,d]cyclohepten-5-yl)-5-methyl-4-phenylthiazole and 2-(10,11 - dihydro - 5H - dibenzo[a,d]cyclohepten - 5 - yl)-5-ethyl-4-phenylthiazole, respectively.

EXAMPLE 2

2 - (10,11 - dihydro - 5H - dibenzo[a,d]cyclohepten - 5-yl)-4-phenylthiazole prepared as described in Example 1 is stirred with a solution of hydrogen chloride in anhydrous ether. The product is collected and dried to furnish 2-(10,11-dihydro-5H-dibenzo[a,d]cyclohepten-5-yl)-4-phenylthiazole hydrochloride, melting over a range of 125–144° C. Elemental analysis confirms the empirical formula $C_{24}H_{20}ClNS$.

In the same manner but using the 5-methyl and the 5-ethyl analogs obtained in Example 1, the corresponding hydrochloride salts thereof are also obtained, viz, 2-(10,11 - dihydro - 5H - dibenzo[a,d]cyclohepten - 5 - yl) - 5-methyl-4-phenylthiazole hydrochloride and 2-(10,11-dihydro - 5H - dibenzo[a,d]cyclohepten - 5 - yl) - 5 - ethyl-4-phenylthiazole hydrochloride, respectively.

We claim:
1. A compound selected from the group which consists of compounds of the formula

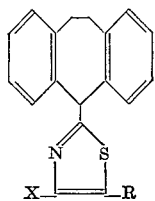

wherein X represents phenyl and R is selected from the group consisting of hydrogen and lower alkyl containing from one to four carbon atoms; and salts thereof with pharmacologically acceptable acids.

2. 2-(10,11-dihydro-5H-dibenzo[a,d]cyclohepten-5-yl)-4-phenylthiazole as claimed in claim 1.
3. 2-(10,11-dihydro-5H-dibenzo[a,d]cyclohepten-5-yl)-5-methyl-4-phenylthiazole, as claimed in claim 1.
4. 2-(10,11-dihydro-5H-dibenzo[a,d]cyclohepten-5-yl)-5-ethyl-4-phenylthiazole, as claimed in claim 1.
5. 2-(10,11-dihydro-5H-dibenzo[a,d]cyclohepten-5-yl)-4-phenylthiazole hydrochloride, as claimed in claim 1.
6. 2-(10,11-dihydro-5H-dibenzo[a,d]cyclohepten-5-yl)-5-methyl-4-phenylthiazole hydrochloride, as claimed in claim 1.
7. 2-(10,11-dihydro-5H-dibenzo[a,d]cyclohepten-5-yl)-5-ethyl-4-phenylthiazole hydrochloride, as claimed in claim 1.

References Cited
UNITED STATES PATENTS 3,279,918  10/1966  Cassiers et al. _____ 260—302
3,344,180   9/1967  Davis et al. _____ 260—302

ALTON D. ROLLINS, *Primary Examiner.*

U.S. Cl. X.R.
167—33, 53, 55, 65; 260—592